United States Patent
van Putten et al.

(10) Patent No.: US 7,636,666 B2
(45) Date of Patent: Dec. 22, 2009

(54) GAS-ENERGY OBSERVATORY

(76) Inventors: Mauritius H. P. M. van Putten, 266 Pearl Sheet A, Cambridge, MA (US) 02139; Antonius F. P. van Putten, Gulbergoven 4, Eindhoven, 5645 KK (NL); Michael J. A. M. van Putten, Beukinkshaat 120, 7511 RR, Enschede (NL); Pascal F. A. M. van Putten, Ruys de Berenbrouckstraat 20, 2513 AT, Delft (NL)

( * ) Notice: Subject to any disclaimer, the term of this patent is extended or adjusted under 35 U.S.C. 154(b) by 173 days.

(21) Appl. No.: 11/495,705

(22) Filed: Jul. 31, 2006

(65) Prior Publication Data

US 2008/0027885 A1    Jan. 31, 2008

(51) Int. Cl.
*G06Q 10/00* (2006.01)
*G05D 17/00* (2006.01)

(52) U.S. Cl. .......................... 705/1; 700/291
(58) Field of Classification Search .............. 705/412, 705/7, 8, 10, 1, 14; 700/291; 702/61, 60; 703/2, 6
See application file for complete search history.

(56) References Cited

U.S. PATENT DOCUMENTS

| | | | |
|---|---|---|---|
| 6,178,362 B1 * | 1/2001 | Woolard et al. | 700/295 |
| 6,528,957 B1 * | 3/2003 | Luchaco | 315/307 |
| 6,577,962 B1 * | 6/2003 | Afshari | 702/61 |
| 6,601,033 B1 * | 7/2003 | Sowinski | 705/1 |
| 6,785,592 B1 * | 8/2004 | Smith et al. | 700/291 |
| 2001/0020219 A1 * | 9/2001 | Kishlock et al. | 702/61 |
| 2003/0065560 A1 * | 4/2003 | Brown et al. | 705/14 |
| 2007/0203860 A1 * | 8/2007 | Golden et al. | 705/412 |
| 2007/0244604 A1 * | 10/2007 | McNally | 700/291 |
| 2007/0250386 A1 * | 10/2007 | Wyckoff | 705/14 |
| 2008/0147465 A1 * | 6/2008 | Raines et al. | 705/7 |

OTHER PUBLICATIONS

What this great U-turn by Labour on HIPs could mean to you (Labour Party UK; Jul. 23, 2006) 2 pages.*
U.S. Appl. No. 11/337,350, 2007, Maurice HPM van Putten.
Proc. Roy Soc. A, 2007, Maurice HPM van Putten.

* cited by examiner

*Primary Examiner*—Igor N Borissov (57) ABSTRACT

A method for generating a home energy efficiency label based on real-time measurements of gas-energy usage of a household and outside temperature data. The home energy efficiency label is calculated by correlating energy usage of the household to the outside temperature and presented to a home owner in real-time on a computer screen, thereby enabling prediction of potential energy savings by lowering indoor climate temperatures. The home energy efficiency label certifies home energy efficiency and can be used on a housing market including home appraising and financing.

2 Claims, 5 Drawing Sheets

GAS-ENERGY OBSERVATORY

BACKGROUND OF THE INVENTION

Today's high-energy prices and growing awareness of greenhouse gas emissions confronts consumers with the global nature of energy and environment. Observations show an unambiguous correlation between rising levels of $CO_2$ in the atmosphere and rising global temperatures. The onset of this trend appears to coincide with the dawn of the industrial revolution. Thus, the global mean temperature shows an increase of about one degree Celcius while the $CO_2$ concentration has increased some 30%. This trend is expected to persist well into the present century due to the long survival time of $CO_2$ in the atmosphere.

The direct link between global energy needs and the global climate is unprecedented, and managing this relationship may be a defining political challenge for the twenty first century. While current changes in global climate remain smooth perturbations up to the present, and hence may be reversible, abrupt changes of stability in the global climate are possible, as inferred from geological records. Abrupt changes can have lasting consequences. They can occur, for example, by a change of topology of global currents in the atmosphere and oceans. Global currents are responsible for convective heat-transport on a global scale, and their stability is key to the existing global climate. Loss of stability may arise out of changes in planetary radiation balance and the natural $CO_2$ cycle, such as by melting of polar ice-caps and large-scale man-made tropical deforestation. The potential impact of destabilizing the global climate on the economy, health and way of living remains largely unknown. In the absence of means for climate stabilization, other than stimulating the rebuilding forests, preventive measures appear to be method of choice for responsible long-term energy policies.

Despite these risks, global energy needs will continue to demand fossil fuels for some time to come. In the US, residential energy-consumption is responsible for about 20% of the US $CO_2$ emissions. Natural gas accounts for about 20% hereof, or about 4% of the US $CO_2$ emissions. Although residential heating forms a relatively minor factor in the total of all greenhouse gas emissions, it forms a potentially powerful factor in public awareness of energy usage and greenhouse emissions.

Yearly changes in residential gas-energy reveal appreciable fluctuations, which are highly sensitive to weather. The overall national US residential gas-usage changes a few percent in response to a change of one degree Celcius of winter temperature (on the basis of the cold winter of 1996; based on DOE 2006). This correlation shows the relevance of home energy efficiency, comprising the combined efficiency of heating and insulation. However, the use of national averages completely disguises the weather-sensitivity of an individual home. The field-experiment reported here reveals a weather-sensitivity on the order of tens of percents. This discrepancy suffices to demonstrate the need for home-specific energy efficiencies.

Public policy towards residential gas-energy savings is effective, provided that it (1) recognizes the complex interaction of human energy needs, quality home building and climate, (2) stimulates the creation of the tools for efficient energy management on the basis of quantitative analysis of the relevant physical and economical parameters, and (3) provides a long-term sustainable outlook which engages the broader public by increasing energy awareness and by providing economic incentives. Motivated by the first, we focus in this disclosure largely on the second item and partly on the third.

Measuring home energy efficiency can serve as a significant step towards saving energy by increasing public awareness. It serves as an incentive towards using energy-efficient home-climate systems and home-improvements in heating equipment and home-insulation. Introducing high-standards for home energy efficiency in new and existing buildings fits in well with the overall objectives of the Kyoto Protocol on reducing greenhouse gas emissions. Here, modern technical developments may make a contribution through dedicated measurement and validation systems. The Kyoto Protocol commits developed countries to making the necessary investments in technology and climate research.

Here, we disclose a novel Van Putten-Gas Energy Observatory (VP-GEO) which combines high-resolution gas-energy information with local weather data. It visualizes human behavior in using residential facilities such as taking showers, washing and cooking, and performs weather sensitivity analysis. The latter determines the dependency of gas-energy usage on the observed outside temperatures and provides a measure for home energy efficiency. Understanding weather sensitivity creates new opportunities for energy saving home-climate control algorithms. These data further serve as feedback to the user, increasing energy awareness and stimulating energy-saving behavior and quality home-construction.

Public dissemination of VP-GEO weather data creates a unique in-situ climate observational systems with exceptional area coverage and spatial resolution. Gas-metering, in existence since invention of the mechanical bellow meter in 1812 by Samuel Clegg, may be just the vehicle of choice for detailed long-term climate observations at no additional cost.

In this disclosure, we introduce the VP-GEO presenting gas-energy information to the consumer with wireless uplink to a remote display, personal computer or hand-held device, featuring

- The complete picture of human behavior in gas-energy usage
- Weather-sensitivity analysis specific to observed weather-pattern and home
- Interactive energy saving strategies in home climate control systems
- Energy audits of homes, home-improvements, residential facilities and climate control
- Integration into a wide area climate observation system for public use.

It has been well-recognized that climate research depends crucially on quality data. Archiving high-precision weather information over long periods of time with wide area coverage and high spatial resolution is the basis for resolving climate trends (Nat. Acad. Sc. 1999). Local weather data of the VP-GEO can be publicly disseminated in the interest of climate research. This dual-use is a "no-regrets" strategy, in the broader effort to reducing global greenhouse gas emissions and international exchange of new energy and climate monitoring technologies. It can be pursued at little extra cost, and the overhead in this effort is consistent with the Kyoto Protocal on investments in technology and climate research.

Here, we disclose the technical implementation of the VP-GEO following the existing trend in small, smart and easy-to-use products. It consists of the following novel hardware, measurement principles and data-analysis:

- Thermodynamic anemometry using a silicon flow-sensor in CMOS and wireless outside temperature sensor
- High-resolution flow-measurements at 0.4 Hz creating 1 Mbyte per day Weather-sensitivity analysis for total gas-energy usage to the observed weather pattern and a measurement of home energy efficiency quality A wireless graphical user-interface for real-time and total gas-energy usage, charts of gas-energy usage histories and weather-sensitivity parameters Interactive energy-saving algorithms correlated to the outside temperature, and remote control of a stand-by mode by GPRS.

A brief description of the method and device is disclosed below, together with a disclosure of first experimental results from a recent home-installation of the Van Putten-Gas Energy Observatory (VP-GEO).

SUMMARY OF THE DISCLOSURE

Figure 1:
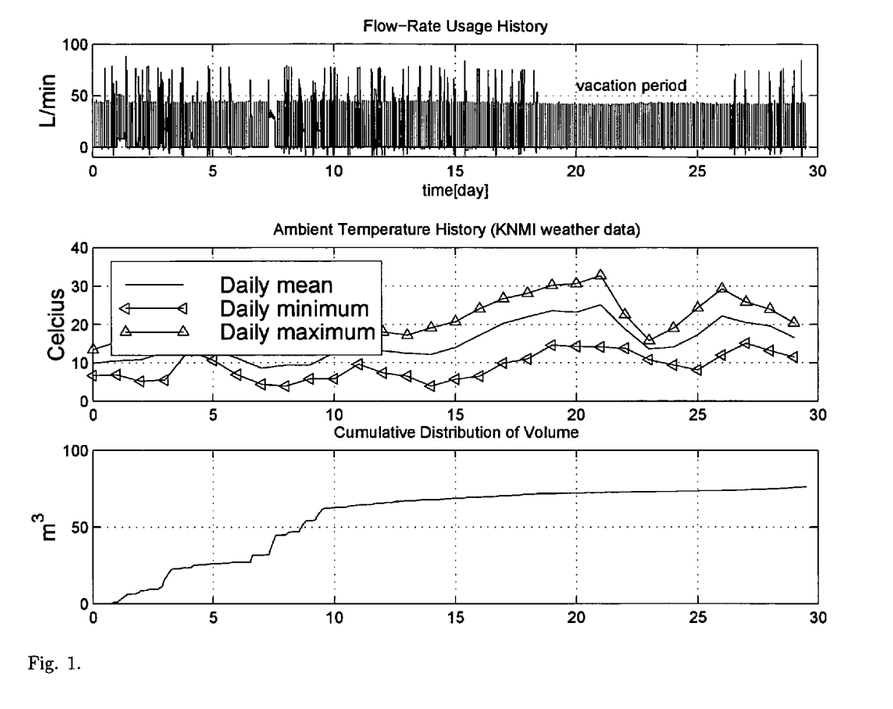
FIG. 1 shows the VP-GEO data over the 30-day period May 23-Jun. 22 (2006) in Eindhoven, The Netherlands (top window), the outside temperature in Eindhoven as determined by the national weather service KNMI (middle window) and the cumulative distribution of gas-usage (bottom window). The VP-GEO data are obtained with a sampling rate of 24 per minute, corresponding to about 1 Mbyte per day. Notice an eight-day period of "quiescences" corresponding to a vacation period during which time there was no one living in the house. During this time, only the central heater and boiler system periodically reheated its warm water tank, consuming a few hundred liters of natural gas per day. Noticeably high gas-usage occurred around May 27, 2006 and Jun. 1, 2006, when the outside minimum temperature dropped to about 5 C.°, while extremely low gas-usage occurred during the warm days when the house was not occupied.

We disclose the VP-GEO which combines high-resolution gas-flow measurements with local weather data. FIG. 1 shows the results of a field-test over a 30-day period May 23 through Jun. 22, 2006. At a sampling rate of 0.4 Hz, it represents about 30 Mbyte of VP-GEO data. Notice a large gap of inactivity during about eight days during a vacation period with no one present. During that time, the only activity is periodic re-heating of warm-water in the reservoir of a high-efficiency boiler, corresponding to a few hundred liters of gas per day. Local weather data are shown in the second window, provided by the national weather service KNMI for the city Eindhoven. VP-GEO data thus create a visual representation of human behavior in using residential facilities and allows for an in-depth correlation with local weather data.

Figure 2:
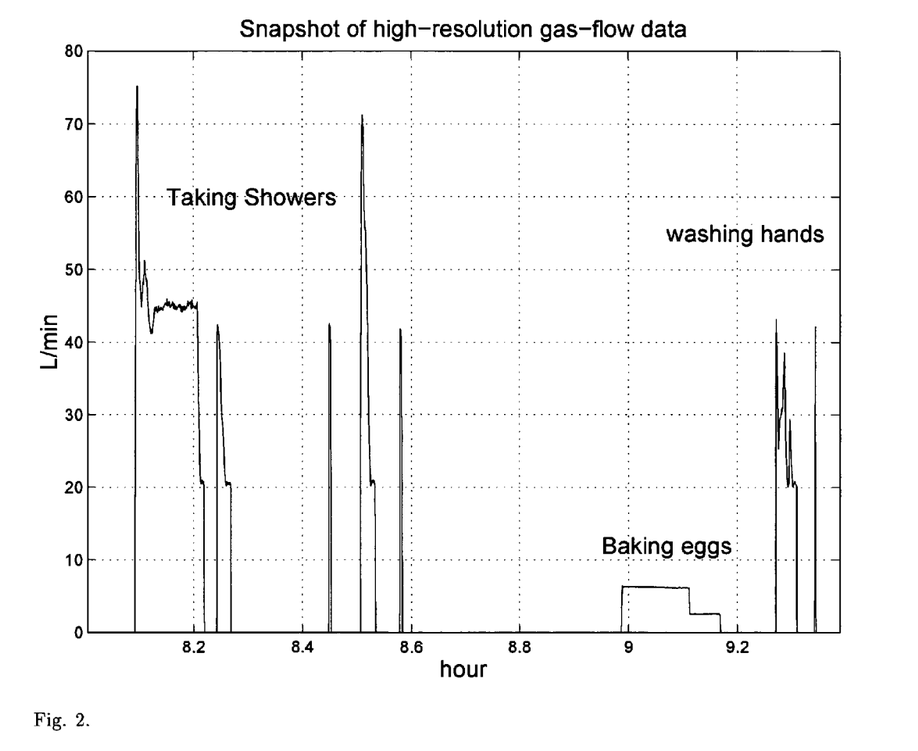
FIG. 2 visualizes human behavior in gas-energy usage associated with using residential facilities such as taking showers, baking eggs and hand-washing dishes. Each of these activities shows a distinct signature, which provides a unique form of feedback to the user.

Human behavior in gas-energy usage relates to the use of warm water in residential facilities, such as washing and shaving, showering and bathing, as well as gas-powered cooking and baking. FIG. 2 shows a snapshot of the data of FIG. 1, showing various morning activities such as taking a shower, baking eggs and hand-washing dishes. FIG. 2 reveals specific signatures of these various residential facilities. It hereby provides direct feedback with detailed burst-volumes of gas-usage. Each burst-volume specifies the amount of gas and hence the cost of using a residential facility.

Figure 3:
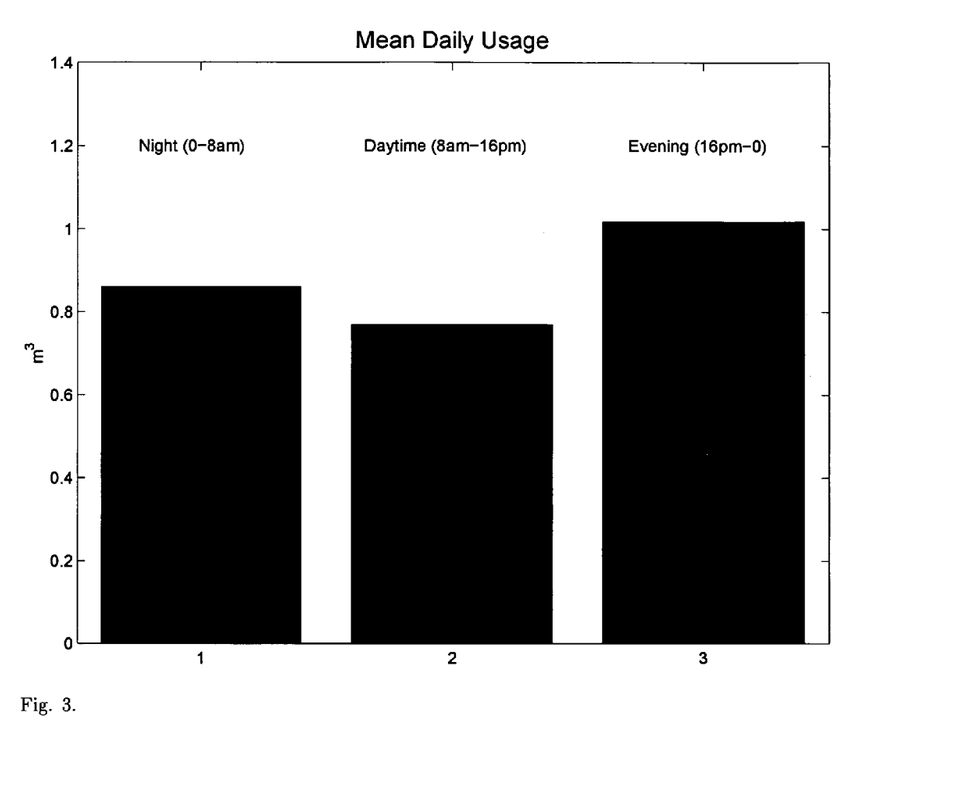
Figure 4:
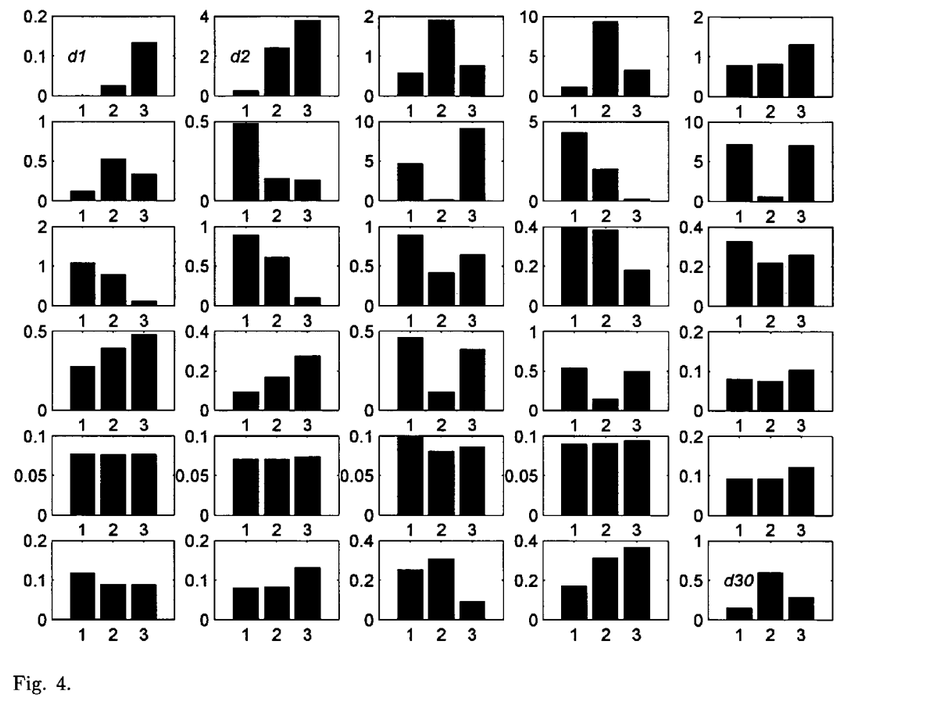

Human behavior in gas-energy usage generally varies with the time of the day. Most commonly, showers are taken in the morning, while cooking is relatively extensive late afternoon or early evening. During the night, gas-energy usage is typically associated with heating or re-heating of a warm-water reservoir in a high-efficiency boiler, possibly augmented with additional heating during cold weather. It is informative to present total gas-energy usage as a function of a partition of the day in, e.g., the time-frames 0:00-8:00, 8:00-16:00 and 16:00-24:00 hr. FIG. 3 shows the mean-daily usage in these three time-frames, averaged over the aforementioned 30 day-period. Notice that gas-usage during the night is less than that in the evening period, which we attribute to the on-average warm weather period. In reality, however, the daily usage shown in FIG. 4 in the same three time-frames varies tremendously from day-to-day. Notice here the extremely low gas-energy usage during the "stand-by" period when the home was not occupied.

Figure 5:
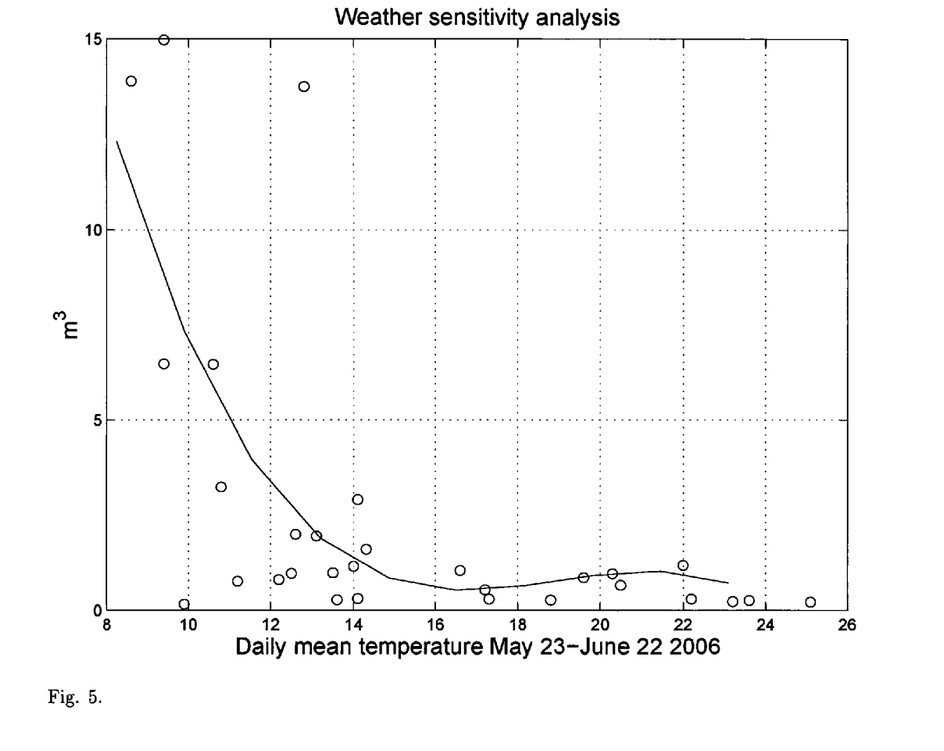

Weather-sensitivity analysis can be performed by calorimetry. In equilibrium between heat generated in the home and cooling by conduction, (forced) convection (by winds) and radiation to the environment, it suffices to determine gas-energy used in heating with correlations to the outside temperature. Thus, we can perform weather sensitivity analysis by considering the response to small fluctuations in room-temperature or, equivalently, in response to virtual changes in outside temperature. To begin, we plot gas-energy usage as a function of outside temperature as shown in FIG. 5. We observe a critical outside temperature of about $T^* \cong 15$ C.°, below which gas-energy usage begins to increase appreciably above the mean-daily usage associated with residential facilities. Since the latter is determined by the quality of the home and human behavior, weather-sensitivities are user-dependent and must be determined for each individual home.

The continuous curve in FIG. 5 shows the best-fit cubic polynomial $y(T, \{T_i\})$ to the measured daily gas-energy usage as a function of the outside temperature T, given the observed sample of outside temperatures $\{T_i\}$. On this basis, we can calculate a Total Climate Sensitivity (TCS) in the form of a finite-difference derivative $$TCS = 100\% \frac{<y(x,\{T_i - 1K\})> - <y(x,\{T_i + 1K\})>}{2K <y(x,\{T_i\})>} \quad (1)$$

in units of % $K^{-1}$. Here, $<f(x)>$ refers to the average with respect to the dummy variable x over the temperature range in the observed data $\{T_i\}$. TCS expresses the sensitivity in total gas-energy usage to the observed outside weather pattern. The expression (1) exploits the fact that gas-energy usage in heating is a function primarily of the temperature difference between room and outside temperature. Computing the response in total gas-energy usage in response to a change in inside temperature is hereby equivalent to computing the same in response to a virtual change in outside temperature (except for a minus sign). Notice further that (1) separates out weather sensitivity as defined by heating and home-insulation, independent from the generally weather-independent gas-energy consumption by using residential facilities such as taking showers, washing and cooking. The latter, instead, sets a constant baseline above T*, as defined by human behavior and family composition.

We can target specific energy savings according to the reciprocal of TCS. To this end, consider $TCS \cong 36\% K^{-1}$ in the data shown in FIG. 5. In terms of daily means, a lowering of the home-temperature by 0.14K below that during the 30 day field-test predicts an energy savings of about 5%, assuming a similar weather pattern to persist. Naturally, weather is subject to pronounced changes. The true energy savings achieved by lowering the home-temperature of 0.16K can only be determined at the end of the next period, upon applying (1) to the actual weather pattern in a subsequent period of interest.

We can measure Home Energy Efficiency (HEE) comprising the combined effect of the heating system and insulation by exploting the natural span in outside temperatures. To this end, we calculate HEE at a relatively low outside temperature well below the critical value T*, at which time heating constitutes an appreciable part of the total gas-energy usage. About an outside temperature $T_{out}$=10 C.°, for example, we define a finite difference derivative $$HEE_{10} = \frac{y(11K,\{T_i\}) - y(9K,\{T_i\})}{2K} \quad (2)$$

in units of $m^3 K^{-1}$. Note that (2) represents a local derivative which expresses a sensitivity in gas-energy usage associated with heating at a specific choice of outside temperature, independent of gas-energy usage associated with use of facilities or choice of home climate control. To leading order, gas-energy usage in heating is proportional to the difference in inside and outside temperatures, whereby (2) is largely independent of choice of inside temperature. For our data shown in FIG. 5, we find $HEE_{10} \cong 81$ $m^3 K^{-1}$.

Monitoring $HEE_{10}$ continuously over the lifetime of a home serves a variety of purposes. It can be used to characterize the quality of home-insulation, and to detect aging therein. The same applies to the heating system or home-improvement. It also serves as an energy quality label with applications to the housing market. Given current energy prices, home energy efficiency is expected to become an important factor in the price of a home, similar to gas-mileage in the pricing of economy cars. The Dutch government, for example, is considering an energy quality label for homes, to stimulate quality home building.

Finally, the above-mentioned weather sensitivity analysis can be refined by performing it for each of the three day-periods 0:00-8:00, 8:00-16:00, and 16:00-24:00 hr separately. Doing so requires detailed temperature measurements for each of these periods, rather than daily averages. For this purpose, the VP-GEO incorporates its own outside temperature measurement device, rather than relying on the daily averages provided by the national weather service.

SURVEY OF THE DRAWINGS

FIG. 3 shows the monthly-mean gas-usage partitioned in three time-frames (1) 0:00-8:00, (2) 8:00-16:00 and (3) 16:00-24:00 hr of the day. Human behavior in regards to use of residential facilities is correlated with the hour of the day, e.g., showers are most common in the morning and dinner is in the evening. For this reason, a gas-usage partition in various time-frames reflects specific contributions by human behavior, facilitating comparisons between homes and evaluations of changes in human behavior. The same holds true for heating, except for its strong dependence on weather. For this reason, a separate weather-sensitivity analysis for each of the three time-frames could be informative.

FIG. 4 shows the gas-usage partitioned in the three time-frames of FIG. 3, displayed for each of the 30 days (d1, d2, ..., d30) in our field test, expressed in units of $m^3$. Notice the strong variability in usage, both in totals for each day and across the partition over the three periods. Especially striking is the influence of cold weather, around May 27 and June 1st during this period. Gas-usage may be dominant in the evening on some days, while it is dominant in the morning on other days. Noticeably low gas-usage is during the eight-day vacation period with warm weather at home. A 30-day period appears to be suitable for averaging purposes, sufficient to capture the main characteristics of a season.

FIG. 5 shows the weather-sensitivity analysis, based on a best-fit cubic polynomial interpolation of daily total gas-usage versus daily mean temperature, here during the 30-day field-test period. Notice a critical temperature $T^* \cong 15$ C.°, below which heating in response to low outside temperatures, begins to appear as a relevant gas-energy usage. The polynomial approximation allows the calculation of various characteristic derivatives, notably a Total Climate Sensitivity (TCS) of 36% $K^{-1}$ (29 $m^3$ $K^{-1}$ $month^{-1}$) and a Home Energy Efficiency (HEE) of 81 $m^{-3}$ $K^{-1}$ $month^{-1}$ at $10^{-1}$ C outside temperature. The reciprocal of the TCS can be used towards targeting specific energy-savings or, equivalently, a specific reduction in $CO_2$ output. TCS provides a recommended moderation of inside climate, e.g., by a change in daily mean inside temperature or, in the Helios mode, a change in the correlation with the outside temperature. In the case at hand, TCS predicts a 5% energy savings by lowering the mean inside temperature by 0.14K. HEE comprises the combined efficiency of heating equipment and home insulation, calculated about a temperature well below $T^*$. HEE is similar to gas-mileage of a car, in that it expresses the cost of a comfortable living as a function of quality of the home, independent of human behavior related to residential facilities. HEE hereby provides an energy quality label for a home.

PREFERRED EMBODIMENTS

The preferred embodiment follows current trends in small, smart and easy-to-use, while paying attention to safety, reliability, data-integrity and battery-free operation to facilitate decade-long observations.

The preferred embodiment for measuring gas-energy usage is the CMOS-based electronic gas meter disclosed earlier (van Putten et al. 1974-5, 1985, 1994-7, 1999, 2001-2) based on a novel principle of thermodynamic anemometry (van Putten et al. 2006). The electronic gas-meter has been tested for safety in the form of a leak-test at 5 bar helium, which far exceeds the requirements of a domestic gas-meter. The same physical unit collects temperature data from both outside and inside, the latter possibly from multiple sensing points. The combined gas-meter, a wireless interface to temperature sensors and micro-electronics for data-archiving and data-analysis comprises the basic hardware of the VP-GEO unit. The concentration of these functions into one unit at the level of the gas-meter is motivated by requirements of reliability and data-integrity. For safe battery-free operation, the VP-GEO is powered by a standard outside adapter, connected to the wall or main electrical power cable.

The preferred embodiment for the temperature sensors is a solar-cell powered wireless unit with high-performance capacitor for short-duration energy storage. It serves to produce temperature measurements at low-frequency sampling and data-transmission rates to the VP-GEO. We estimate that an update frequency of about once per hour suffices for the intended weather-sensitivity analysis and interactive energy saving climate control algorithms. The same temperature sensor unit can be used for both inside and outside temperature measurements. Measurement of inside temperatures can further be performed at various locations, should differentiation for climate-control of different rooms be desirable. However, the inside temperature measurements need not be communicated to the VP-GEO but, rather, to a climate control unit.

In the preferred embodiment, a climate control unit (CCU) is centrally located and connected to the VP-GEO by wireless communication. The preferred communication channel is a widely used open commercial link, e.g., Bluetooth, allowing access by the user through a home computer, PDA or mobile phone. (These open channels can still be password encrypted.) The CCU serves several user-friendly and climate control functions. It presents snapshots of human behavior in gas-energy usage by real-time gas-flow measurements (FIG. 2), outside temperatures (second window of FIG. 1), room temperature(s), statistics (FIGS. 3-4), and the weather-sensitivity estimates TCS and HEE.

Specifically, the CCU features the following preferred interactive information and energy-saving features.

Visualization of gas-energy usage representing gas-flow measurements at a high-sampling rate on the order of 1 Hz (0.4 Hz in our field-test), complemented with various graphs of gas-energy usage histories. The histories including histograms of gas-energy usage partitioned over a various time-frames of the day, notably $$(1)\ 0{:}00{-}8{:}00,\ (2)\ 8{:}00{-}16{:}00,\ (3)\ 16{:}00{-}24{:}00\ \text{hr}. \qquad (3)$$

Each time-frame reflects different outside temperatures and human activities in regards to residential facilities.

Weather-sensitivity analysis representing the quantities TCS and HEE, detailed in Eqs.(1-2). TCS can be presented as weekly, monthly or yearly averages. As a refinement, they can further be generated by data from each of the aforementioned time-frames (3) in order to detect the time-frame most sensitive to weather, and hence most amenably to energy savings. The TCS and HEE are archived for long-term storage to monitor the overall performance of the home and climate system, to serve as a reference in the validation of future home-improvements, to detect aging effects in heating system and home-insulation and to create an energy label for the home on the housing market.

Climate-control algorithms for an optimal balance between comfort and economy in energy usage:

Stand-by mode: a low-temperature mode when no one is present in the home. The stand-by mode can be operated manually and by mobile phone through GPRS. Operation by mobile phone with password allows the user to switch-off and switch-on the home-climate system during trips away from home.

$CO_2$-saving knob: a small-step decrease in home-temperature calculated on the basis of TCS with the aim of achieving a specific $CO_2$-reduction target. This feature, when used successively, allows a gradual change in home-climate, on a time-scale of human adaptation. For example, a 5% $CO_2$-saving knob corresponds to a room-temperature decrease by 0.14K in our field-test study.

Helios climate mode: a home-climate correlated to weather. Correlating the inside temperature to the outside temperature consistent with the human biological clock, providing a natural swing between high- and low-temperatures during the day and night. For example, a linear Helios climate imposes an inside temperature satisfying $$T_{inside}=T_0+C*f(T_{outside}), \qquad (4)$$

where C denotes a correlation coefficient with the outside temperature $T_{outside}$ and $T_0$ a mean, minimal or maximal inside temperature. Here, f might represent a high-pass filter, to pass on the swing in outside temperatures while suppressing the mean in the same. In general, a Helios climate is subject to constraints to ensure safety and minimum comfort and health standards. Safety requires a home-temperature to remain well above zero degrees Celcius to prevent freezing while for health, a home-temperature must be sufficiently high to prevent a cold, humid home-climate to set in.

Some of the above features can be combined. The constants $T_0$ and C in (4) can be changed when using the $CO_2$-saving feature. On the basis of TCS, we can change them to target a specific $CO_2$-savings. In the case at hand, TCS predicts a 5% $CO_2$-savings upon lowering the daily mean inside temperature by 0.14K.

It will be appreciated that a climate control which results in little heating tends to produce a small TCS. (Notice that HEE is independent of climate control). In particular, zero heating, e.g., during warm periods of the year, produces zero TCS. Energy-saving typically follows an increase in C in (4), allowing a larger swing in inside temperature through an enhanced correlation between inside and outside temperature. Notice that the limit of no heating and open windows gives $T_{inside}=T_{outside}$. This limit can be used to define a maximal value of C.

The preferred embodiments presented here serve to illustrate the main VP-GEO concept of approaching energy savings through climate-control on the basis of advanced measurement and data-analysis of gas-energy usage and weather data. In practice, variations in the detailed implementation of the VP-GEO concept are possible, while remaining within the general frame-work set forth in the following claims.

REFERENCES

1. National Academy of Sciences, 1999, "Adequacy of climate observing systems"
2. National Academy of Sciences, 2001, "Climate change science: an analysis of some key questions"
3. National Academy of Sciences, 2006, "Surface Temperature Reconstructions for the last 2000 years"
4. Department of Energy, 2006, Carbon Dioxide Emissions, 2006, http://www.eia.doe.gov/oiaf/1605/gg04rpt/carbon.html
5. van Putten, A. F. P., & Middelhoek, S., 1974, Electron. Lett., 10, 425
6. van Putten, A. F. P., 1975, Device for measuring the flow velocity of a medium, U.S. Pat. No. 3,996,799
7. van Putten, A. F. P., 1985, Ambient temperature compensated double bridge anemometer, U.S. Pat. No. 4,548,077
8. van Putten, M. J. A. M., van Putten, M. H. P. M., & van Putten, A. F. P., 1994, Sensors & Actuators, 44, 13
9. van Putten, M. H. P. M., van Putten, M. J. A. M., van Putten, A. F. P., & van Putten, P. F. A. M., 1995, U.S. Pat. No. 5,426,969
10. van Putten, A. F. P., van Putten, M. J. A. M., & van Putten, M. H. P. M., 1996, Measurement Science and Technology, 7, 1360
11. van Putten, M. J. A. M., van Putten, M. H. P. M., van Putten, A. F. P., Pompe, J. C., Bruining, H. A., 1997, IEEE T. Biomed. Eng., 44, 205
12. van Putten, M. J. A. M., van Putten, M. H. P. M., & van Putten, A. F. P. van Putten, 1999, IEEE T Instruments and Measurements, 48, 724
13. van Putten, M. J. A. M., & van Putten, M. H. P. M., 2001, Sensors and Actuators, 90, 172
14. van Putten, M. H. P. M., van Putten, M. J. A. M., van Putten, A. F. P., & van Putten, P. F. A. M., 2002, EU Patent 94202293.0
15. van Putten, M. H. P. M., van Putten, M. J. A. M., van Putten, A. F. P., & van Putten, P. F. A. M., 2006, U.S. patent application Ser. No. 11/337,950

We claim:

1. A method for generating a home energy efficiency label comprising:

measuring, in real-time, said gas-energy usage of a household, said measuring comprising metering of normal volume constituting displacement of molar content per unit time by application of a gas meter compensated for temperature and pressure variations in natural gas flow;

obtaining, in real time, outside temperature data by at least one of: obtaining outside temperature data from the Internet or by using a temperature measurement device outside of the household;

receiving by a household computer said real-time measurements of gas-energy usage and temperature data;

displaying said received data on a household computer screen;

correlating, in real-time, by said computer the received gas-energy usage to the received outside temperature data by applying statistical analysis, said correlating comprising: antecedent (a) calculating a ratio HEET0 of change in gas-energy usage to change in outside temperature about a fixed reference temperature T0 characteristic for cold weather when heating is required by the following formula:

$$HEET0=[y(T0+\Delta T,\{Ti\})-y(T0-\Delta T,\{Ti\})]/(2\Delta T),$$

where $\Delta T$ is a temperature difference and $y(T,\{Ti\})$ denotes an approximation curve that is a closest fit to the received data on gas energy usage versus the received data $\{Ti\}$ on outside temperature T by statistical analysis;

(b) calculating the mean of ratio (a) over reference temperature T0 given by the received outside temperature over a time period, wherein (a) expresses the degree to which gas-energy usage in heating is influenced by cold weather and (b) expresses the degree to which gas-energy usage is influenced by the most recent weather pattern;

displaying the results of (a) and (b) on said household computer screen simultaneously with time history of said real-time gas-energy usage and outside temperature both for the same period of time, wherein said period of time is selected from a few minutes to a few years, generating, by a computer, the home energy efficiency label comprising in one graph said approximation curve and said received data on enemy usage and outside temperatures, and the results of (a) and (b);

using the label to certify home energy efficiency on a housing market including home appraising and financing.

2. The method for generating a home energy label as in claim 1, further comprising:

using the label to predict potential energy savings associated with lowering indoor temperature by one degree;

displaying the predicted potential energy savings on the household computer screen to create continuous feedback to home owners to enable said home owners to adjust indoor climate comfort versus energy usage.

* * * * *